United States Patent Office 3,337,525
Patented Aug. 22, 1967

3,337,525
(HYDROXYETHYL POLYETHYLENEOXYAMINO)-
PHENYLAZO NAPHTHALEN-1,8-DIOLS
Earl Peters and Hans H. Kuhn, Spartanburg, S.C., assignors to Deering Milliken Research Corporation, Spartanburg, S.C., a corporation of Delaware
No Drawing. Filed June 5, 1964, Ser. No. 373,046
10 Claims. (Cl. 260—200)

This invention relates to novel blue tints having substantially complete fugitivity from substantially all textile fibers and having improved light fastness.

In order to identify synthetic and natural fibers during spinning and weaving operations, the fibers are often marked with fugitive tints, that is to say, the fibers are given a temporary coloration which is easily removable upon completion of spinning and weaving operations. Preferably a fugitive tint should have fugitivity from all textile fibers after exposure to any conditions used in textile production or finishing operations. The fugitive tints should also have color stability, that is to say, there should be no pronounced fading when the tints are subjected to heat and light. While fugitive tints meeting the aforementioned prerequisites have been produced in a variety of shades, the blue fugitive tints previously known to the textile industry have been deficient in either their light stability or their universal fugitivity from textile fibers. It should be understood that the term "blue fugitive tint" as used herein is meant to define true blue tints and more specifically those blue tints which fall within the blue hue groups of the Color Index Hue Indication Chart of the American Association of Textile Chemists and Colorists. True blue tints are especially important in the production of acceptable green tints which are prepared by the blending of blue tints with yellow tints. The light stability which exists among those blue hue universally fugitive tints which were previously known is quite unsatisfactory. In view of the fact that blue dyestuffs having the same chromophoric moiety as the blue fugitive tints have in general adequate light stability, the lack of light stability among the blue fugitive tints heretofore known is quite surprising.

It is therefore an object of this invention to produce blue fugitive tints which have a high degree of fugitivity to textile fibers and which have satisfactory light stability.

It is another object of this invention to produce blue fugitive tints having a true blue coloration and which have a high degree of fugitivity to textile fibers and which have satisfactory light stabiltiy.

These and other objects of the invention will become apparent from the following description.

The novel tints of this invention have the following general formula:

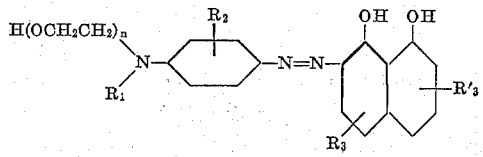

wherein $R_1$ is $H(OCH_2CH_2)_n$, aryl, alkyl, alkaryl or aralkyl, $R_2$ is hydrogen, alkyl, aryl, alkaryl or alkoxy and $R_3$ and $R'_3$ are members independently selected from the group consisting of H— radicals and —$SO_3H$ radicals, $R_2$ and $R_3$ being positioned and selected such that when $R_2$ and $R_3$ are both radicals other than hydrogen, one of the $R_2$ and $R_3$ radicals is positioned meta to the azo radical and $n$ is in all cases, an integer between about 15 and about 500.

In the above compounds, when $R_1$ is $H(OCH_2CH_2)_n$—, $n$ is preferably between about 25 and 100 and more preferably between about 35 and 75; at least one of $R_2$, $R_3$ and $R_4$ is hydrogen; and aryl, alkyl, alkaryl, aralkyl and alkoxy preferably contain from one to twelve carbon atoms, and preferably are hydrocarbon, e.g., phenyl, naphthyl, methyl, ethyl, propyl, tolyl, mesityl, benzyl, phenethyl, etc., any substituents thereon being of a nonfunctional and nonreactive nature which will not interfere in the reactions described below for preparing such compounds. When $R_1$ is other than $H(OCH_2CH_2)_n$—, $n$ is preferably twice the above values.

These tints have a true blue color, are fugitive with respect to all textile fibers according to the standards set forth by the industry for fugitive tints useful for temporarily identifying fibers, yarns or fabrics, and have an unexpectedly high degree of lightfastness.

The compounds of this invention are prepared by the following series of reactions.

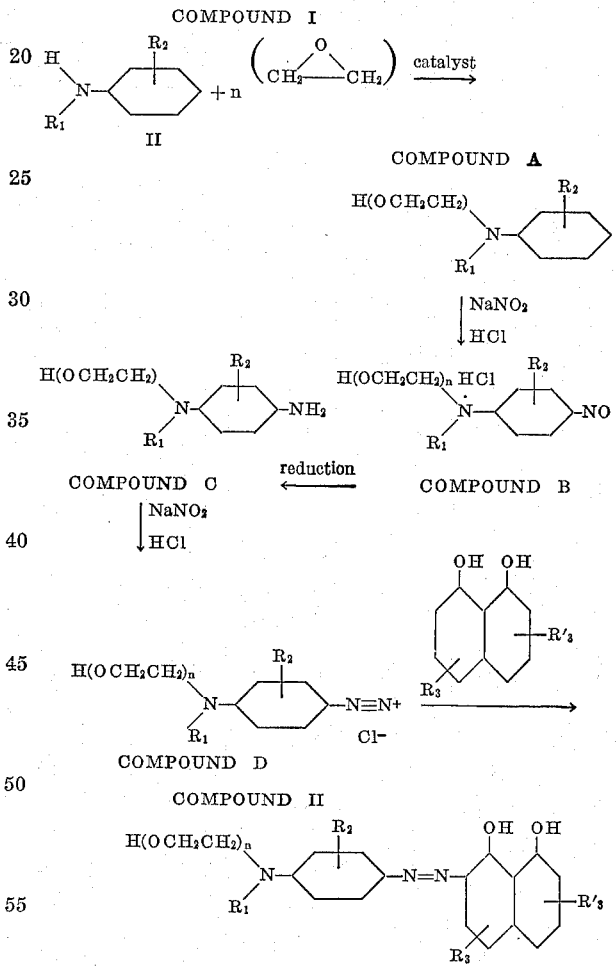

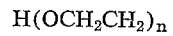

wherein $R_1$ is a member selected from the group consisting of aryl, alkyl, alkaryl, aralkyl, $H(OCH_2CH_2)_n$ and $n$ is an integer of from 15 to 500 with the exception of Compound I, in which case $n$ is 1 when $R_1$ is $$H(OCH_2CH_2)_n$$

and $R_2$ is a member selected from the group consisting of hydrogen, alkyl, aryl, alkaryl, aralkyl and alkoxy and $R_3$ and $R'_3$ are radicals independently selected from the group consisting of H— and —$SO_3H$ radicals, $R_2$ and $R_3$ being positioned and selected such that when $R_2$ and $R_3$ are both radicals other than hydrogen, one of the $R_2$ and $R_3$ radicals is positioned meta to the azo radical.

Quite unexpectedly, the coupling reaction for the coupling of the dihydroxy compound to the diazo compound is preferably carried out at a pH of about 12. High pH coupling reactions are usually not employed as highly alkaline conditions are commonly believed to promote the decomposition of diazo compounds. In the reaction carried out according to the process of this invention, however, it is found that the high pH does not cause the diazo compound to decompose and that coupling between the diazo compound and the dihydroxy compound will not take place unless a pH greater than about 10 is employed. The high pH is critical due to the fact that the polyethoxylated diazo compound is sluggish to coupling reactions.

The following preparations designated as preparation series A through D are illustrative of the compounds of this invention and methods for their preparation, each preparation series corresponding to that general compound having the same alphabetical title appearing in the foregoing reaction series. It should be understood that the following preparations are given for purposes of illustration and should not be considered as limiting the spirit or scope of this invention.

*Preparation A–1*

One mole (181 grams) of N,N-di(hydroxyethyl)aniline (wherein $R_1=HOCH_2CH_2$ and $R_2=H$) in a flask equipped with stirrer, thermometer and gas inlet tube near the bottom and a gas outlet tube near the top of the flask, is heated to 140° C. under nitrogen. About 200 mg. of sodium is added as catalyst. Ethylene oxide is bubbled into the molten, vigorously stirred material at a rate such that a slight amount of gas escapes from the outlet tube. The ethylene oxide addition is continued, with cooling to maintain the temperature between about 140–160° C., until about 98 moles (4312 g.) of ethylene oxide has reacted, thus producing N,N-di(hydroxyethylpolyethyleneoxy)-aniline containing a total of about 100 ethyleneoxy groups.

*Preparation A–2*

The procedure of Preparation A–1 is repeated with the exception that the ethylene oxide addition is carried out with the temperature being controlled in the range of about 140–160° C. until about 13 moles (572 grams) of ethylene oxide has reacted thus producing N,N-di(hydroxyethylpolyethyleneoxy)-aniline containing a total of about 15 ethyleneoxy groups.

*Preparation A–3*

The procedure of Preparation A–1 is repeated with the exception that ethylene oxide addition is carried out at a temperature controlled in the range of from about 140° C. to about 160° C. until about 198 moles (8712 grams) of ethylene oxide has reacted thus producing N,N-di(hydroxyethylpolyethyleneoxy)-aniline containing a total of about 200 ethyleneoxy groups.

*Preparation B–1*

About 1 mole (4500 g.) of N,N-di(hydroxyethylpolyethyleneoxy)-aniline obtained according to the procedure of Preparation A–1 (wherein $R_1=H(OCH_2CH_2)_n$, $n=50$ and $R_2=H$) is dissolved in a mixture of 4 liters of water and 2.14 moles (206.6 g.) of 37.8% hydrochloric acid. The mixture is cooled to 0–5° C. and with stirring a solution of 1.07 moles (74 g.) of sodium nitrite in 250 ml. of water is added over a 30 minute period, maintaining the mixture at that temperature and continuing the stirring for an additional 30 minutes when the addition is complete. There is thus produced the p-nitroso derivative of the starting compound, which compound should immediately thereafter be reduced to the more stable p-amino derivative.

*Preparation B–2*

The procedure employed in Preparation B–1 is repeated with the exception that about 1 mole of N,N-di(hydroxyethylpolyethyleneoxy) - aniline obtained according to the procedure of Preparation A–2 (wherein $R_1=H(OCH_2CH_2)_n$, $n=15$ and $R_2=H$) is employed.

*Preparation B–3*

The procedure employed in Preparation B–1 is repeated with the exception that about 1 mole of N,N-di(hydroxyethylpolyethyleneoxy)-aniline obtained according to the procedure of Preparation A–3

(wherein $R_1=H(OCH_2CH_2)_n$, $n=500$ and $R_2=H$)

is employed.

*Preparation C–1*

To the cool solution obtained according to Preparation B–1 containing the N,N-di(hydroxyethylpolyethyleneoxy)-p-nitroso-aniline ($R_1=H(OCH_2CH_2)_n$, $n=50$ and $R_2=H$) is added 7 moles (676 g.) of 37.8% hydrochloric acid with stirring followed by 3.5 moles (225 g.) of zinc dust. One-half of the latter is added over a thirty minute period followed, fifteen minutes later, by the remaining half over an additional thirty minute period. Stirring is continued until the characteristic yellow compound of the nitroso compound disappears, keeping the temperature at all times below 20° C. The excess zinc is removed by filtration leaving a clear solution containing the hydrochloric acid salt of N,N-di(hydroxyethylpolyethyleneoxy)-phenylenediamine.

*Preparation C–2*

The procedure outlined in Preparation C–1 is repeated with the exception that the cool solution obtained according to Preparation B–2 containing the N,N-di(hydroxyethylpolyethyleneoxy) - p - nitroso - aniline (wherein $R_1=H(OCH_2CH_2)_n$, $n=15$ and $R_2=H$) is employed.

*Preparation C–3*

The procedure set forth in Preparation C–1 is repeated with the exception that the cool solution obtained according to Preparation B–3 containing the N,N-di(hydroxyethylpolyethyleneoxy)-p-nitroso-aniline ($R_1=H(OCH_2CH_2)_n$, $n=500$ and $R_2=H$)

is employed.

*Preparation D–1*

To the solution obtained according to the procedure of Preparation C–1 containing the hydrochloric acid salt of N,N - di(hydroxyethylpolyethyleneoxy) - phenylenediamine (wherein $R_1=H(OCH_2CH_2)_n$, $n=50$ and $R_2=H$) is added 193 g. of 37.8% hydrochloric acid and the mixture is cooled to 0° C. With vigorous stirring and cooling to maintain the temperature below about 5° C., a solution of 1.01 mole (70 g.) of sodium nitrite in 280 ml. of water is quickly added. After 30 minutes, the excess nitrous acid is destroyed with sulfamic acid to provide a negative starch-iodide test. The solution is then carefully brought to a pH of 4 with dilute aqueous sodium carbonate, to provide the diazonium salt of N,N-di(hydroxyethylpolyethyleneoxy) - phenylenediamine (wherein $R_1=H(OC_2H_4)_n-$, $n=50$, $R_2=H$).

*Preparation D–2*

The procedure according to Preparation D–1 is repeated with the exception that the solution obtained according to the procedure of Preparation C–2 containing the hydrochloric acid salt of N,N-di(hydroxyethylpolyethyleneoxy) - phenylenediamine (wherein $R_1=H(OCH_2CH_2)_n$, $n=15$ and $R_2=H$) is employed.

*Preparation D–3*

The procedure according to Preparation D–1 is repeated with the exception that the solution obtained according to the procedure of Preparation C–3 containing the hydrochloric acid salt of N,N-di(hydroxyethyl-polyethyleneoxy)-phenylenediamine (wherein $R_1=H(OCH_2CH_2)_n$, $n=500$ and $R_2=H$)

is employed.

Following the procedure of Preparation Series A through Preparation Series D, other compounds represented by Compound I, that is N,N-di(hydroxyethyl)-substituted o-toluidine, o-anisidine, o-diphenylamine, o-benzylaniline, o-tolylaniline, o-phenethylaniline and N-hydroxyethyl-substituted N-methylaniline, N-ethylaniline, N-phenylaniline, N-benzylaniline, N-tolylaniline, N-phenethylaniline, N-methyl-o-toluidine, N-methyl-o-anisidine, N-methyl-o-benzylaniline, and N-methyl-o-phenyl-aniline, are converted to the corresponding diazonium salts, i.e., compounds represented by Compound D.

Similarly, the N,N-di(hydroxyethylpolyethyleneoxy) and N-hydroxyethylpolyethyleneoxy diazonium compounds represented by Compound II and containing a total of about 15, 30, 50, 75, 100, 250 or 500 ethyleneoxy groups, and otherwise corresponding to the above-named compounds, are prepared from the corresponding N-hydroxyethyl compounds represented by Compound I by varying the amount of ethylene oxide reacted with the N-hydroxyethyl compound in the reaction described in Preparation A.

EXAMPLE I

One mole calculated on the basis of pure material 1,8-dihydroxynaphthalene-3,6-disulfonic acid sodium salt is dissolved in one liter of water and the pH of the solution is then adjusted to about 12 and 200 g. of ice is added. To this cold solution is slowly added, with vigorous stirring, the still cold solution of the diazonium salt of N,N-di(hydroxyethylpolyethyleneoxy)-phenylenediamine (wherein $R_1=H(OCH_2CH_2)_n$, $n=50$, $R_2=H$) obtained according to the procedure of Preparation D-1. The blue tint is formed almost immediately. After one hour the mixture is filtered and neutralized with hydrochloric acid to a pH of 7. If desired, the tint may be isolated by evaporation of the water at about 60° C. under vacuum, dissolving the tint in benzene, toluene, or xylene, filtering salts which precipitate, and distilling the solvent. A melt of the purified tint is obtained which solidifies on cooling.

EXAMPLE II

One mole calculated on the basis of pure material of 1,8-dihydroxynaphthalene-5-sulfonic acid sodium salt is dissolved in one liter of water and the solution is brought to a pH of about 12. 200 g. of ice is then added to this solution. To this cold solution is then added, with vigorous stirring, the still cold solution of the diazonium salt of N,N-di(hydroxyethylpolyethyleneoxy)-phenylenediamine wherein $R_1=R(OCH_2CH_2)_n$, $n=15$ obtained according to the procedure of Preparation D-2. A blue tint is formed almost immediately. After one hour the mixture is filtered and neutralized with hydrochloric acid to a pH of 7. If desired, the tint may be isolated by evaporation of the water at about 60° C. under vacuum, dissolving the tint in benzene, toluene or xylene, filtering salts which precipitate, and distilling the solvent. A melt of the purified tint is obtained which solidifies on cooling.

EXAMPLE III

One mole, calculated on the basis of pure material, of 1,8-dihydroxynaphthalene is dispersed in one liter of water and the dispersion adjusted with sodium hydroxide to a pH of about 12 whereby a solution is formed. 200 g. of ice is then added to the solution. To the cold solution is then added, with vigorous stirring, the still cold solution of the diazonium salt of N,N-di(hydroxyethylpolyethyleneoxy)-phenylenediamine $R_1=R(OCH_2CH_2)_n$, $n=500$ obtained according to the procedure of Preparation D-3. A blue tint is formed almost immediately. After one hour the mixture is filtered, if necessary, and neutralized with hydrochloric acid to a pH of 7. If so desired, the tint may be isolated by evaporation of the water at about 60° C. under vacuum, dissolving the tint in benzene, toluene or xylene, filtering salts which precipitate, and distilling the solvent. A melt of the purified tint is obtained which solidifies on cooling.

It should be understood that those compounds named in the paragraph following Preparation D-3 containing a total of from about 15 to about 500 ethyleneoxy groups may also be reacted with sulfonic acid substituted and unsubstituted 1,8-dihydroxynaphthalene.

Having thus disclosed the invention, what is claimed is:

1. A compound having the formula

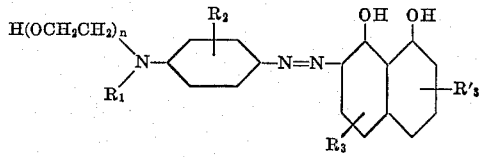

wherein $R_1$ is a member selected from the group consisting of $H(OCH_2CH_2)_n$ and aryl, alkyl, alkaryl and aralkyl each containing up to 12 carbon atoms, $R_2$ is a member selected from the group consisting of hydrogen and alkyl, aryl, alkaryl, aralkyl and alkoxy each containing up to 12 carbon atoms and $R_3$ and $R'_3$ are members independently selected from the group consisting of H— radicals and —$SO_3H$ radicals, $R_2$ and $R_3$ being positioned and selected such that when $R_2$ and $R_3$ are both radicals other than hydrogen, one of the $R_2$ and $R_3$ radicals is positioned meta to the azo radical and $n$ is an integer between about 15 and about 500.

2. The compound of claim 1 wherein $R_3$ is H and $R'_3$ is $SO_3H$.

3. The compound of claim 1 wherein both $R_3$ and $R'_3$ are $SO_3H$.

4. The compound of claim 1 wherein both $R_3$ and $R'_3$ are H.

5. A compound having the formula

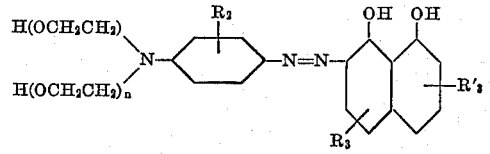

wherein $R_2$ is a member selected from the group consisting of hydrogen and alkyl, aryl, alkaryl, aralkyl and alkoxy each containing up to 12 carbon atoms, $R_3$ and $R'_3$ are members independently selected from the group consisting of H— radicals and $SO_3H$— radicals, $R_2$ and $R_3$ being positioned and selected such that when $R_2$ and $R_3$ are both radicals other than hydrogen, one of the $R_2$ and $R_3$ radicals is positioned meta to the azo radical and $n$ is an integer between about 15 and 500.

6. The compound of claim 5 wherein $n$ is an integer between about 25 and 100.

7. The compound of claim 5 wherein $R_3$ is H and $R'_3$ is $SO_3H$.

8. The compound of claim 5 wherein both $R_3$ and $R'_3$ are $SO_3H$.

9. The compound of claim 5 wherein both $R_3$ and $R'_3$ are H.

10. A compound having the formula

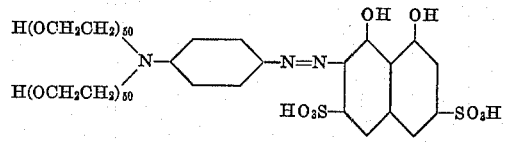

(References on following page)

References Cited

UNITED STATES PATENTS

| | | | |
|---|---|---|---|
| 567,615 | 9/1896 | Runkel | 260—200 |
| 718,181 | 1/1903 | Weinhert | 260—200 |
| 2,045,323 | 6/1936 | Felix et al. | 260—200 X |
| 2,131,712 | 9/1938 | Schoeller et al. | 260—200 X |
| 2,453,490 | 11/1948 | Callaway et al. | 260—197 |
| 2,750,375 | 6/1956 | Siebert et al. | 260—200 X |
| 2,849,329 | 8/1958 | Braun | 260—197 X |

CHARLES B. PARKER, *Primary Examiner.*

FLOYD D. HIGEL, *Assistant Examiner.*